(12) United States Patent  (10) Patent No.: US 7,954,895 B2
Freeman et al.  (45) Date of Patent: Jun. 7, 2011

(54) CHILD SAFETY SEAT

(75) Inventors: Vincent Freeman, Hampshire (GB); Iain Powell, Hampshire (GB); Gareth James, Andover (GB)

(73) Assignee: Britax Excelsior Limited (GB)

( * ) Notice: Subject to any disclaimer, the term of this patent is extended or adjusted under 35 U.S.C. 154(b) by 224 days.

(21) Appl. No.: 11/994,292

(22) PCT Filed: Jun. 30, 2006

(86) PCT No.: PCT/GB2006/002443
§ 371 (c)(1),
(2), (4) Date: Aug. 13, 2008

(87) PCT Pub. No.: WO2007/003918
PCT Pub. Date: Jan. 11, 2007

(65) Prior Publication Data
US 2009/0212613 A1  Aug. 27, 2009

(30) Foreign Application Priority Data

Jul. 1, 2005 (GB) .................................. 0513459.8
Jul. 2, 2005 (GB) .................................. 0513649.4
Jul. 5, 2005 (GB) .................................. 0513733.6
Mar. 6, 2006 (GB) .................................. 0604505.8

(51) Int. Cl.
A47D 1/10 (2006.01)
A47C 1/10 (2006.01)
(52) U.S. Cl. ..................................... 297/250.1; 297/410
(58) Field of Classification Search ............... 297/250.1, 297/410
See application file for complete search history.

(56) References Cited

U.S. PATENT DOCUMENTS

| | | | |
|---|---|---|---|
| 4,854,639 A * | 8/1989 | Burleigh et al. | 297/250.1 |
| 6,030,047 A | 2/2000 | Kain et al. | |
| 6,491,348 B1 | 12/2002 | Kain | |
| 6,779,843 B2 * | 8/2004 | Kain | 297/250.1 |
| 7,055,903 B2 * | 6/2006 | Balensiefer et al. | 297/256.11 |
| 2004/0189068 A1 | 9/2004 | Meeker et al. | |

OTHER PUBLICATIONS

International Search Report for Application No. PCT/GB2006/002443 mailed Oct. 6, 2006.
International Preliminary Report on Patentability for Application No. PCT/GB2006/002443 completed Nov. 21, 2007.

* cited by examiner

*Primary Examiner* — Milton Nelson, Jr.
(74) *Attorney, Agent, or Firm* — Alston & Bird LLP

(57) ABSTRACT

The present invention provides a child seat (1) comprising a seat back (3), a headrest (4) which is moveable relative to the seat back (3), and a removable harness which may be installed for use in securing an occupant to the seat (1), wherein the headrest (4) is coupled to the seat back (3) such that the headrest (4) may undergo a first extent of movement relative to the seat back (3) when the harness is installed and may only undergo a second further extent of movement relative to the seat back (3) when the harness is removed. In this regard, only when the harness is removed from an operative position, namely one where it is installed such that it can be used to restrain a child, can the headrest (4) undergo its second further extent of movement relative to the seat back (3). This ensures that the headrest (4) is not inappropriately positioned for the group of child being restrained thereby.

18 Claims, 5 Drawing Sheets

CHILD SAFETY SEAT

The present invention relates to a child safety seat, and in particular to an adjustable headrest for a child safety seat having means to prevent incorrect use of the headrest.

In this respect, child safety seats are well known for assisting in securing a child within the interior of a vehicle. Such child seats take many forms but in general involve a seat base which rests on the vehicle seat base, a seat back which, in the case of forwardly facing child seats, rests against the vehicle seat back, and a headrest.

Known child seats provide a harness for securing a child occupant within the interior of a vehicle. Such a harness may generally comprise a pair of shoulder straps connected by a buckle to a crotch strap, and is suitable for securing a Group 1 child within the child seat. A child seat of this type may be provided with an adjustable headrest, whereby limited vertical adjustment of the headrest is permitted to provide the desired comfort and support for a particular child occupant.

Alternative child seats are known which do not secure the occupant by means of a harness. Instead, the child occupant is secured using the vehicle's three-point seat belt. Such child seats are suitable for securing a Group 2 or Group 3 child within the child seat, and may also be provided with an adjustable headrest, whereby limited vertical adjustment of the headrest is permitted to provide the desired comfort and support for a particular child occupant. In general, to provide the desired comfort and support, the distance between the headrest and the seat base will be greater when a Group 2 or Group 3 child is occupying the child seat than when a Group 1 child is occupying the child seat.

It is also known to provide a child seat arranged such that the occupant may be secured using a harness or by using the vehicle's three-point seat belt, dependent on the size of the child to be secured. Such an arrangement is advantageous as it allows a single child seat to be used throughout childhood, thereby saving the inconvenience and expense of having to replace the seat as the child grows. When the child is of a group 1 size, the harness is used to secure the child. As the child grows, the harness may be removed from the child seat, and the vehicle's three-point seat belt instead used to secure the child.

In such an arrangement, the headrest will be required to permit a greater range of vertical adjustment so as to provide the desired comfort and support to all groups of child occupant. In known child seats providing such an arrangement, there is a danger that the headrest may be used in a position which is inappropriate for the particular child occupant. For example, the headrest may be positioned further from the seat base, in a position suitable for a Group 2 or Group 3 occupant, when in fact a Group 1 child is occupying the seat. With such misuse, the headrest will not provide the maximum level of comfort for the occupant and, more importantly, the headrest will not support the occupant's head in the intended manner.

The present invention seeks to resolve such problems of known arrangements.

According to a first aspect of the present invention, there is provided a child seat comprising:
 a seat back;
 a headrest which is moveable relative to the seat back; and
 a removable harness which may be installed for use in securing an occupant to the seat;
 wherein the headrest is coupled to the seat back such that the headrest may undergo a first extent of movement relative to the seat back when the harness is installed and may only undergo a second further extent of movement relative to the seat back when the harness is removed.

In this regard, only when the harness is removed from an operative position, namely one where it is installed such that it can be used to restrain a child, can the headrest undergo its second further extent of movement relative to the seat back. This ensures that the headrest is not inappropriately positioned for the group of child being restrained thereby.

Preferably, the child seat comprises a coupling component for coupling the headrest and the seat back, the coupling component being movable with respect to both the headrest and the seat back.

In a first configuration of the child seat, movement of the headrest is dependent upon movement of the coupling component, and in a second configuration of the child seat, movement of the headrest is independent of movement of the coupling component.

Conveniently, the coupling component and the headrest may each be provided with slots for receiving straps of the harness. The slots may be aligned when the seat is in the first configuration such that the harness may be installed on the seat, and may be misaligned when the seat is in the second configuration such that the harness may not be installed on the seat.

Conveniently, the seat back may include a void which is shaped so as to receive the coupling component.

Conveniently, the child seat may comprise means for providing a plurality of vertical positions at which the coupling component can be positioned relative to the seat back. In this regard, the seat back may be provided with a plurality of vertically aligned seat back notches and the coupling component may be provided with detent means for engagement with the notches and hence the seat back. Resilient means may urge the detent means into engagement with the seat back notches. The resilient means may comprise a spring.

Conveniently, the child seat may comprise means for providing a plurality of vertical positions at which the headrest can be positioned relative to the coupling component. In this regard, the coupling component may be provided with a plurality of vertically aligned coupling component notches and the headrest may be provided with resilient members for engagement with the coupling component notches and hence the coupling component. The headrest resilient members may further comprise one or more protrusions which engage with the coupling component notches, and actuating means may urge the members into engagement with the notches. The actuating means may be a lever which forms a part of the headrest. The lever may be slidably mounted on the headrest and may be biased into urging the headrest resilient members into engagement with the coupling component notches. The lever may further comprise a handle for actuating the lever to release the headrest resilient members to allow relative movement between the headrest and the coupling component.

According to a second aspect of the present invention, there is provided a headrest comprising a coupling component for use in a child seat according to the foregoing.

An example of the present invention will now be described with reference to the accompanying drawings, of which:

Figure 1:
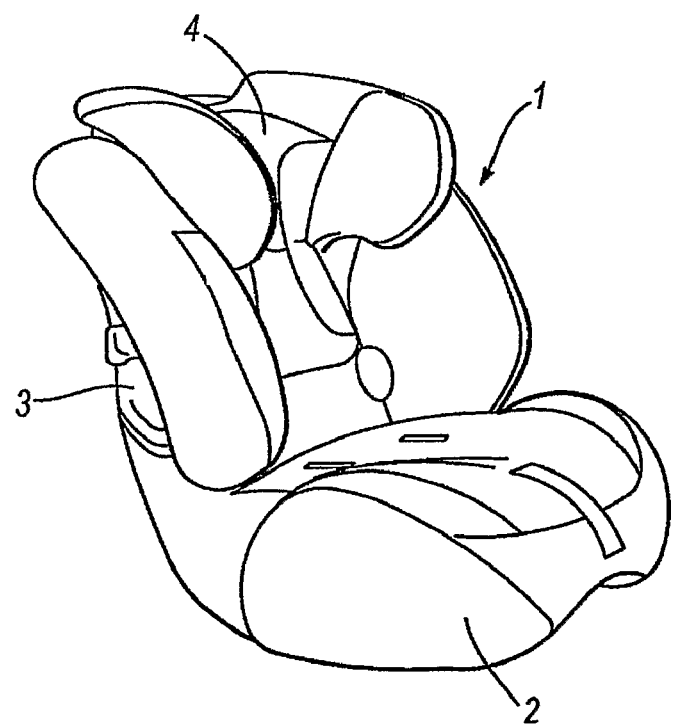
FIG. 1 shows a perspective view of a child seat.

As shown in FIG. 1, a child seat 1 comprises generally a seat base 2 and a seat back 3. The child seat further comprises an adjustable headrest 4 which can be moved in a vertical direction relative to the seat back 3 so as to provide an adjustable distance between the headrest 4 and the seat back 3. In use, the seat base 2 rests on the vehicle seat base and the seat back 3 rests against the vehicle seat back, so that a child occupant faces forwards in the vehicle.

Figure 2:
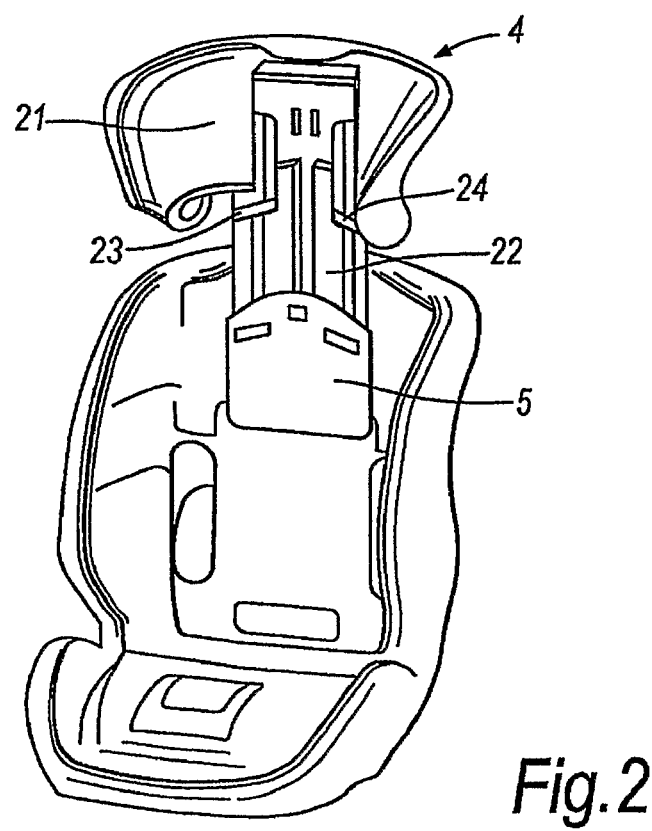
FIG. 2 shows a perspective view of a child seat according to an embodiment of the present invention, with the seat cushioning removed for clarity.
Figure 3:
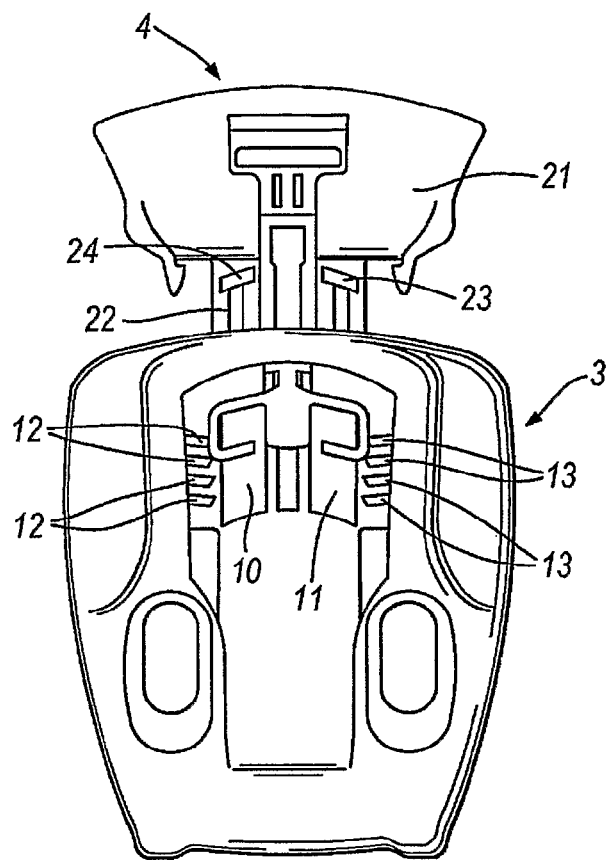
FIG. 3 shows a rear view of a child seat according to an embodiment of the present invention.
Figure 4:
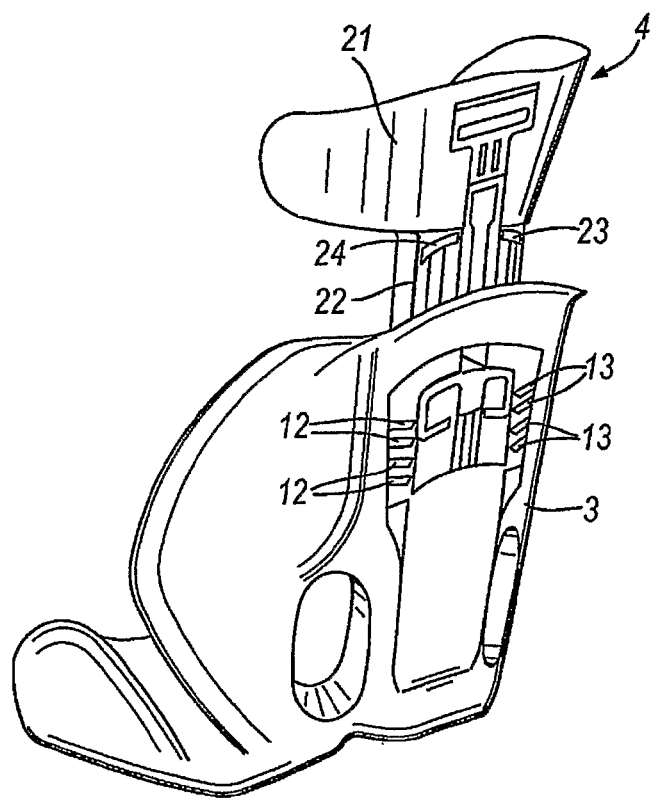
FIG. 4 shows a perspective view of the rear of a child seat according to an embodiment of the present invention.

Referring now to FIGS. 2, 3 and 4, vertical adjustment of the headrest 4 may be provided in two ways. Firstly, it is provided by means of a coupling component in the form of a cartridge 5 which engages with the headrest 4 and which itself is able to move in a vertical direction, together with the headrest 4, relative to the seat back 3. Secondly, adjustment of the headrest 4 may be further provided by uncoupling the headrest 4 from the cartridge 5, so that the headrest 4 is able to move in a vertical direction relative to the cartridge 5, thereby allowing a greater distance to be provided between the headrest 4 and the top of the seat back 3, in a manner to be described more fully below.

Figure 5:
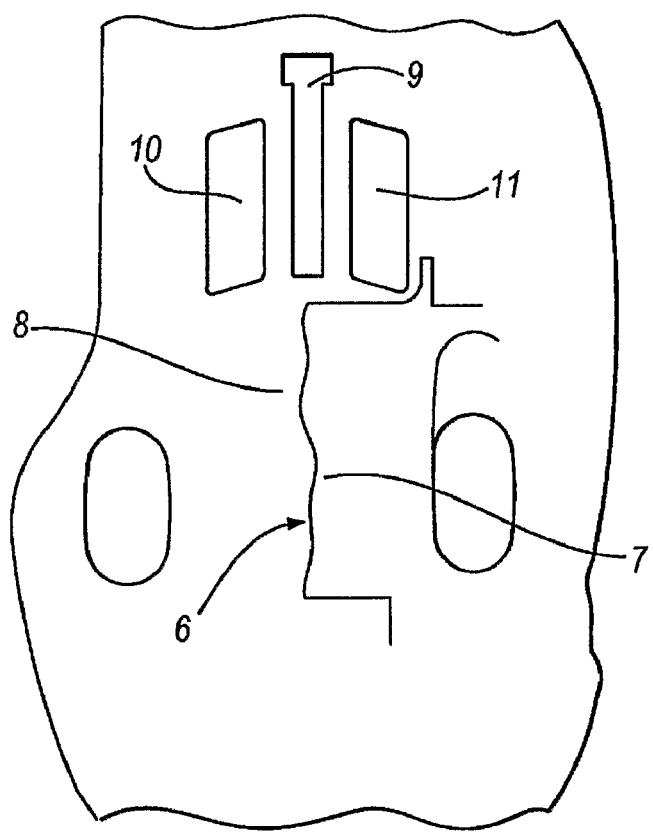
FIG. 5 shows an expanded cut-away view of part of the rear of a child seat according to an embodiment of the present invention.

FIG. 5 illustrates how the seat back 3 is formed to provide a void 6 between the front portion 7 and rear portion 8 of the seat back 3. The front portion 7 is shown cut-away along a substantially vertical jagged line to show the rear portion 8. The void 6 is channel shaped so as to receive the cartridge 5, which is able to move within the void 6 in a vertical direction relative to the seat back 3, in a manner to be described below. The seat back 3 is also provided with a centrally located vertical slot 9 and two further vertical slots 10, 11, the further slots being located one either side of the central slot 9. As can be seen best from FIGS. 3 and 4, the rearward facing surface of the seat back 3 is moulded so as to, provide two parallel series of notches 12, 13 which are vertically aligned and located toward the outer edges of the seat back 3, adjacent to the slots 10, 11.

Figure 6:
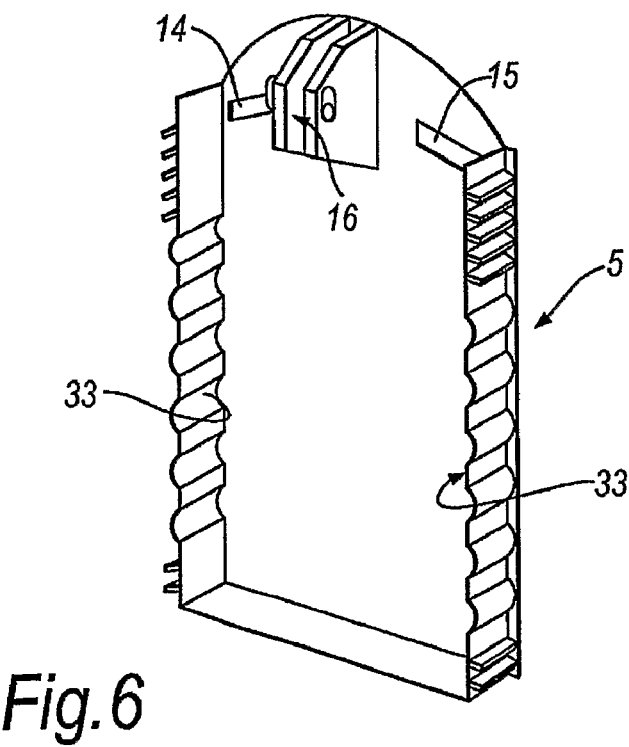
FIG. 6 shows a perspective view of a cartridge of a child seat according to an embodiment of the present invention.
Figure 7:
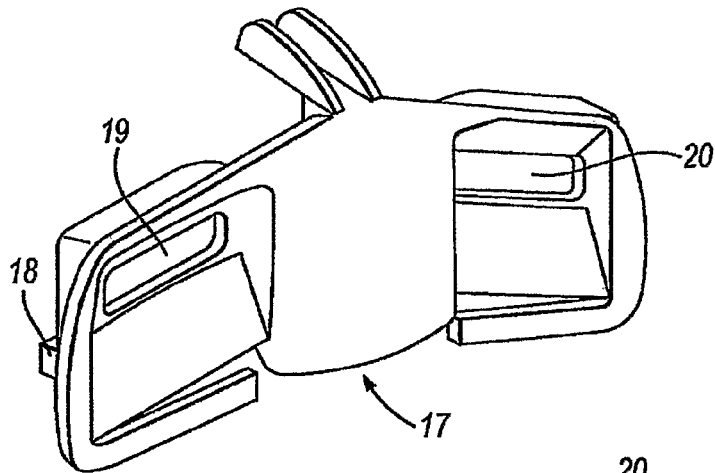
FIGS. 7 and 8 show a perspective view of the rearward-facing and forward-facing surfaces of a detent of a child seat according to an embodiment of the present invention.
Figure 8:
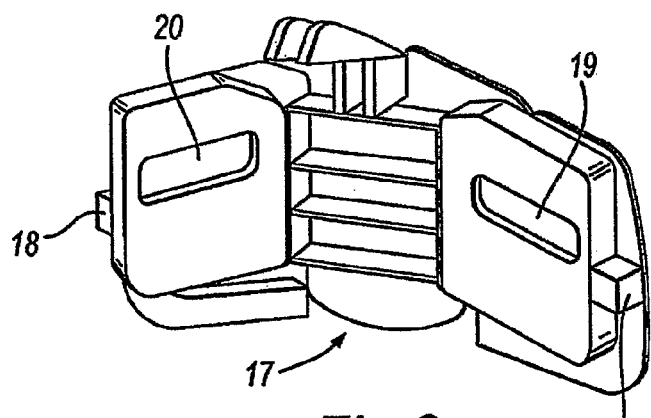

As shown best in FIG. 6, the cartridge 5 contains apertures 14, 15 to allow harness shoulder straps to be installed on the child seat 3. The cartridge 5 has a pivot point 16 which in use extends rearwardly through the central aperture 9 in the seat back 3. The pivot point 16 provides a pivot for a detent 17 shown in FIGS. 7 and 8. The detent 17 has a protrusion 18 on each of the distal ends thereof for engagement with corresponding ones of each of the series of notches 12, 13, thereby providing a number of discrete vertical positions at which the detent 17, and hence the cartridge 5, can be located relative to the seat back 3. The detent 17 is forced to engage with the notches 12, 13 by means of a resilient spring (not shown) located near to the pivot point 16. The detent 17 further comprises openings 19, 20 through which harness shoulder straps can pass. The detent openings 19, 20 align with the cartridge apertures 14, 15 and the two vertical slots 10, 11 in the seat back 3, thereby allowing harness shoulder straps to be installed on the child seat 1 and used when the cartridge 5 is located at any of the possible discrete vertical positions.

Referring back to FIGS. 2 to 4, the headrest 4 comprises a head support portion 21 which provides comfort and support for the occupant of the seat 1 and a stem 22 which locates with both the seat back 3 and the cartridge 5 so as to correctly position the headrest 4 in relation to the seat back 3. The stem 22 contains apertures 23, 24 which align with the apertures 14, 15 in the cartridge 5 when the headrest 4 is positioned in the lowest possible position in relation to the cartridge 5.

Harness shoulder straps, which are suitable for use for securing a Group 1 child, are thus only able to be installed onto the child seat 1 when the apertures 14, 15 in the cartridge 5 and the apertures 23, 24 in the headrest 4 are aligned. Therefore, the mechanism described above enables the headrest 4 to be located only in the limited number of discrete vertical positions at which the cartridge 5 can be located when a Group 1 child is to be secured, thereby limiting the vertical adjustment of the headrest 4 relative to the seat back 3 and so preventing misuse of the child seat 1 when occupied by a Group 1 child.

Figure 9:
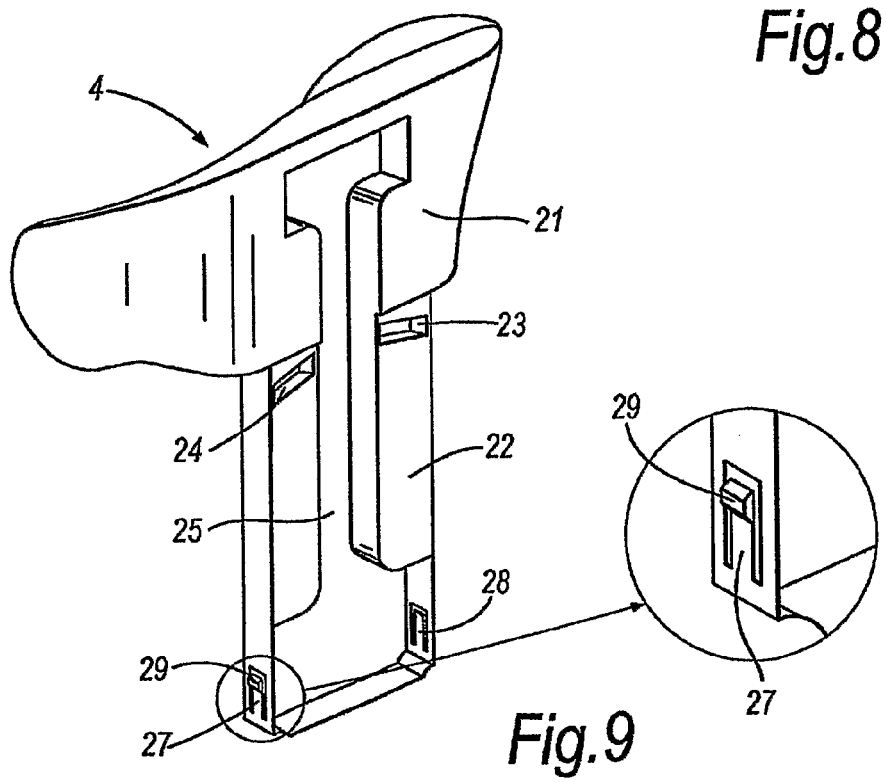
FIG. 9 shows a perspective view of the rear of the headrest of a child seat according to an embodiment of the present invention.
Figure 10:
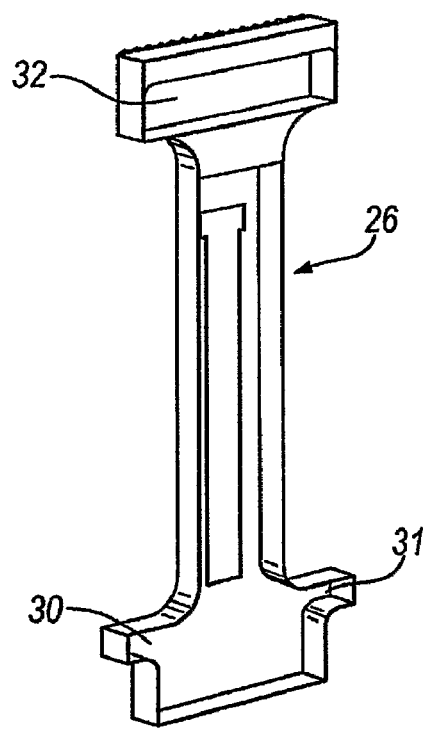
FIG. 10 shows a perspective view of the lever of the headrest of a child seat according to an embodiment of the present invention.

As shown in FIG. 9, the headrest 4 is formed so as to provide a recess 25 for the lever 26 shown in FIG. 10. The lever 26 provides the mechanism whereby the headrest 4 may be disengaged from the cartridge 5. In this regard, towards the bottom of each of the outer surfaces of the stem 22 is located a member 27, 28 which is partially detached from the remainder of the outer surface in that the member 27, 28 is detached on three of its edges and joined to the remainder of the outer edge only on its lower edge. The members 27, 28 are naturally angled slightly inwards relative to the remainder of the outer surface, and contains a protrusion 29 on their outer surface.

Figure 11A:
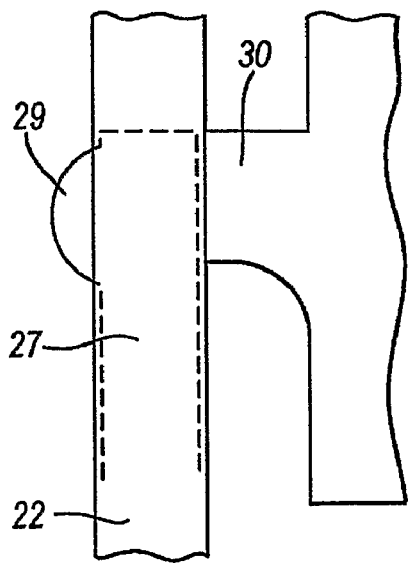
FIGS. 11A and 11B show diagrammatically the actuation of the lever of FIG. 10.
Figure 11B:
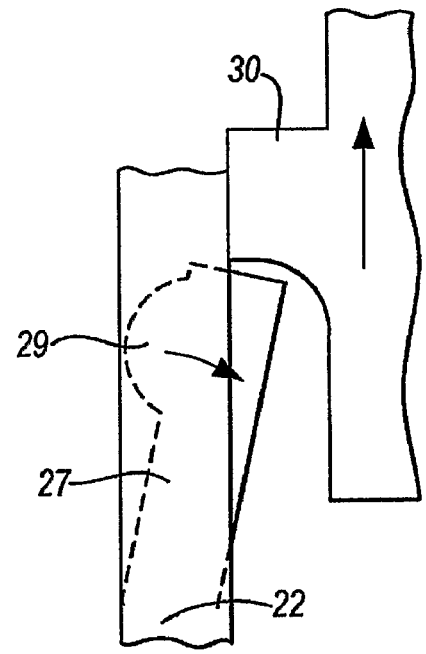

The lever 26 has lugs 30, 31 at its lower end which, when the lever 26 is in place within the recess 25 in the headrest 4, locate with the upper part of the members 27, 28 of the stem 22, thereby forcing the members 27, 28 outwards and hence allowing the protrusions 29 thereon to extend further than the outer edges of the stem 22, as shown in FIG. 11A. The lever 26 has a handle 32 at its upper end, which allows the lever to be actuated and moved upwardly in the recess 25 relative to the headrest 4. A resilient spring (not shown) forces the lever to return to the lower position when the handle 32 is released. When the lever 26 is actuated, the lugs 30, 31 move upwardly and hence free of the members 27, 28. The members 27, 28 are therefore free to return to their natural position, angled slightly inwards relative to the remainder of the outer surface of the stem 22, in which position the protrusions 28 do not extend further than the outer surfaces of the stem 22, as shown in FIG. 11B.

When the lever 26 is not actuated, and the protrusions 28 protrude from the outer surfaces of the stem 22, the protrusions 28 are able to engage with the notched inner surfaces of the outer edges of the cartridge, which are referenced 33 in FIG. 6, thereby providing a number of discrete vertical positions at which the headrest 4 can be located relative to the cartridge 5.

Movement of the headrest 4 relative to the cartridge 5 results in the apertures 14, 15 in the cartridge 5 and the apertures 23, 24 in the stem 22 of the headrest 4 no longer being aligned. This means that the headrest 4 can only be raised relative to the cartridge 5 when harness fittings are not installed onto the child seat 1, as the harness shoulder straps would otherwise restrain such relative movement. Hence, the headrest 4 cannot be raised relative to the cartridge 5 when the seat 1 is set up for a Group 1 child, this mode of operation only being suitable for a Group 2 or Group 3 occupant who is secured using the vehicle's three-point seat belt. Misuse of the child seat 1 when occupied by a Group 2 or Group 3 child is therefore prevented.

The present invention obviates the problem that the headrest 4 may be located in a position that is unsuitable for a Group 1 occupant when a harness is installed on the seat 1, and/or a position that is unsuitable for a Group 2 or Group 3 occupant when a harness is not installed on the seat 1.

The invention claimed is:

1. A child seat comprising:
a seat back;
a headrest which is moveable relative to the seat back;
a removable harness which may be installed for use in securing an occupant to the seat; and
a coupling component for coupling the headrest to the seat back, the headrest being movable with respect to the coupling component and the seat back in a vertical direction when the seat is installed in a vehicle such that the headrest may undergo a first extent of movement relative to the seat back when the harness is installed and may only undergo a second further extent of movement relative to the seat back when the harness is removed wherein the coupling component and the headrest are each provided with slots for receiving straps of the harness.

2. A child seat according to claim 1, wherein in a first configuration, movement of the headrest is dependent upon movement of the coupling component, and in a second configuration, movement of the headrest is independent of movement of the coupling component.

3. A child seat according to claim 1, wherein the seat back includes a void which is shaped so as to receive the coupling component.

4. A child seat according to claim 1, wherein the slots are aligned when the seat is in a first configuration such that the harness may be installed on the seat, and are misaligned when the seat is in a second configuration such that the harness may not be installed on the seat.

5. A child seat according to claim 1, further comprising means for providing a plurality of vertical positions at which the coupling component can be positioned relative to the seat back.

6. A child seat according to claim 5, wherein the seat back is provided with a plurality of vertically aligned seat back notches and the coupling component is provided with detent means for engagement with the notches and hence the seat back.

7. A child seat according to claim 6, wherein resilient means urges the detent means into engagement with the seat back notches.

8. A child seat according to claim 7, wherein the resilient means comprises a spring.

9. A child seat according to claim 1, further comprising means for providing a plurality of vertical positions at which the headrest can be positioned relative to the coupling component.

10. A child seat according to claim 9, wherein the coupling component is provided with a plurality of vertically aligned coupling component notches and the headrest is provided with resilient members for engagement with the coupling component notches and hence the coupling component.

11. A child seat according to claim 10, wherein the headrest resilient members further comprise one or more protrusions which engage with the coupling component notches.

12. A child seat according to claim 10, wherein actuating means urges the members into engagement with the notches.

13. A child seat according to claim 12, wherein the actuating means is a lever which forms part of the headrest.

14. A child seat according to claim 13, wherein the lever is slidably mounted on the headrest and is biased into urging the headrest resilient members into engagement with the coupling component notches, the lever comprising a handle for actuating the lever to release the headrest resilient members for allowing relative movement between the headrest and the coupling component.

15. A child seat comprising:
a seat back;
a headrest which is moveable relative to the seat back;
a removable harness which may be installed for use in securing an occupant to the seat; and
a coupling component for coupling the headrest to the seat back, the headrest being movable with respect to the coupling component and the seat back in a vertical direction when the seat is installed in a vehicle such that the headrest may undergo a first extent of movement relative to the seat back when the harness is installed and may only undergo a second further extent of movement relative to the seat back when the harness is removed;
wherein the coupling component is provided with a plurality of vertically aligned coupling component notches and the headrest is provided with resilient members for engagement with the coupling component notches and hence the coupling component, wherein a lever which forms part of the headrest urges the resilient members into engagement with the notches.

16. A child seat according to claim 15, wherein the headrest resilient members further comprise one or more protrusions which engage with the coupling component notches.

17. A child seat according to claim 15, wherein the lever is slidably mounted on the headrest and is biased into urging the headrest resilient members into engagement with the coupling component notches, the lever comprising a handle for actuating the lever to release the headrest resilient members for allowing relative movement between the headrest and the coupling component.

18. A child seat according to claim 15, further comprising means for providing a plurality of vertical positions at which the coupling component can be positioned relative to the seat back.

* * * * *